United States Patent

[11] 3,545,719

| [72] | Inventors | Robert J. Shulick<br>St. Charles, Illinois;<br>Raymond Stachowski, Chicago, Illinois |
|---|---|---|
| [21] | Appl. No. | 693,201 |
| [22] | Filed | Dec. 26, 1967 |
| [45] | Patented | Dec. 8, 1970 |
| [73] | Assignee | Babson Bros. Co.<br>a corporation of Illinois |

[54] MILK LINE VALVE
5 Claims, 4 Drawing Figs.

[52] U.S. Cl. .................................................. 251/146,
137/322
[51] Int. Cl. ........................................... F16k 51/00
[50] Field of Search .......................................... 251/145,
146, 147, 176, 179; 137/319, 322

[56] References Cited
UNITED STATES PATENTS

| 48,543 | 7/1865 | Floyd | 251/145 |
| 2,881,010 | 4/1959 | Bouma | 251/146X |
| 2,949,276 | 8/1960 | Merritt et al. | 251/146 |
| 2,987,294 | 6/1961 | Merritt et al. | 251/146 |
| 3,011,755 | 12/1961 | Babson | 251/146 |
| 3,272,471 | 9/1966 | McCullah | 251/146 |
| 2,247,357 | 7/1941 | Brus | 251/179X |

*Primary Examiner*—William R. Cline
*Attorney*—Hofgren, Wegner, Allen, Stellman, & McCord

ABSTRACT: A milk pipeline valve which includes a resilient valve seat secured to the pipeline, the valve seat having a circular opening alined with an opening in the pipeline. A valve assembly is supported on guide rods for movement in a plane parallel to the pipeline between a first position in which the assembly overlies the opening in the valve seat and a second position in which the valve assembly is removed from the valve seat. The valve assembly includes a body portion which has a recess with a closure member housed therein which is spring biased for engagement with the valve seat about the opening. A connector nipple is insertable into the opening in the valve seat for communication with the pipeline opening, and the valve seat fits snugly about the nipple to seal the connection.

PATENTED DEC 8 1970
3,545,719
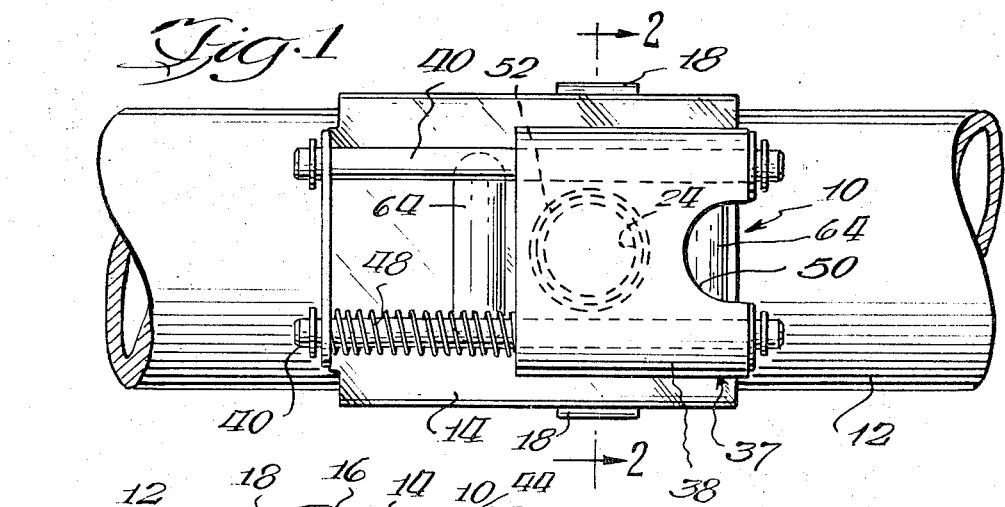
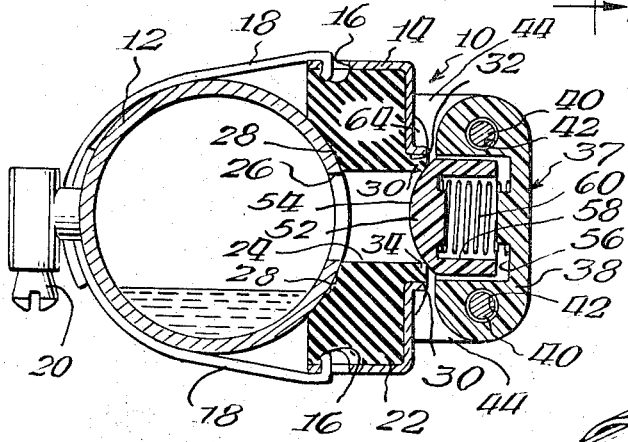
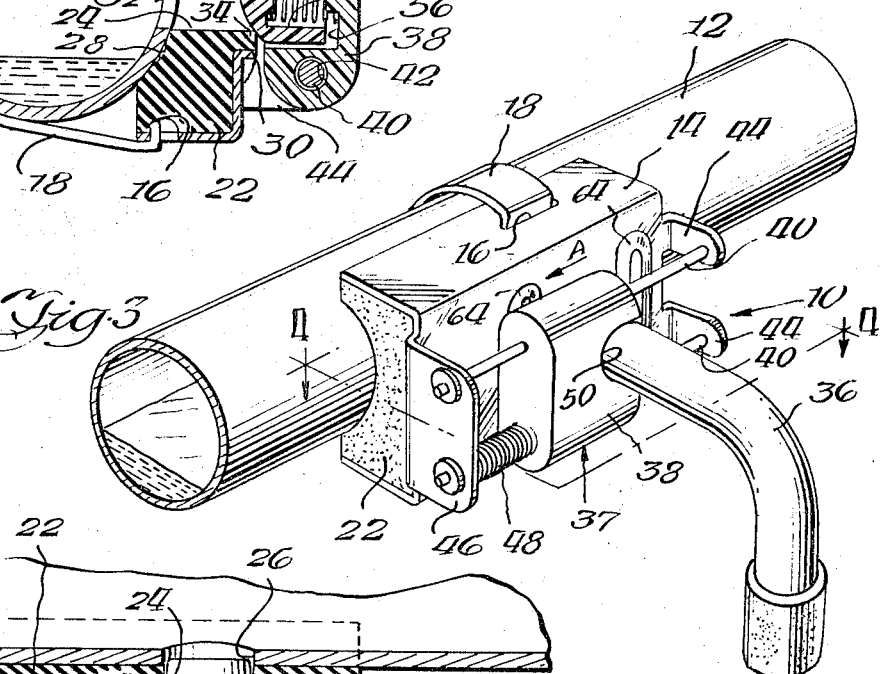
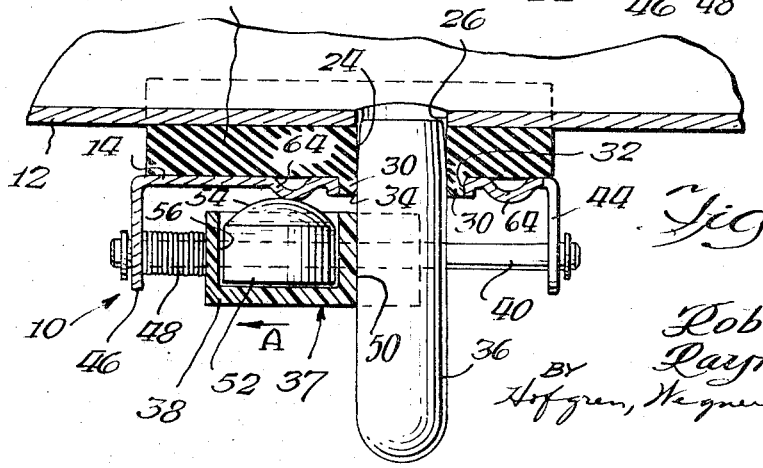
INVENTORS
Robert J. Shulick
Raymond Stachowski
BY Hofgren, Wegner, Allen, Stellman & McCord
ATTORNEYS 3,545,719

MILK LINE VALVE

BACKGROUND OF THE INVENTION

In a "carry away" milk handling system, the milk from the animals is drawn into an evacuated pipeline and flows through the pipeline to a storage tank, milk cans or through additional handling apparatus, as a releaser, pasteurizing equipment or the like. In some installations, the milk from the milking apparatus is introduced into the pipeline through a valve of which there may be several at different points along the length of the pipeline. A flexible hose connects the milking apparatus with the pipeline. The valve must not afford an opportunity for the introduction of foreign matter to the pipeline nor for the contamination of milk contacting surfaces; and the connection between the milk hose and the pipeline must be vacuum tight. Most valves presently used for this purpose may be described as sliding plate valves, and examples can be seen in the patents to Merritt et al. U.S. Pat. Nos. 2,949,276 and 2,987,294; and the patent to Babson 3,011,755. In the sliding plate valve construction, a valve plate and a hose connecter plate are slidably mounted for movement in a plane parallel to the pipeline for cooperation with a resilient, normally rubber, valve seat having an opening in alinement with an opening in the pipeline. Such structures are relatively expensive because the parts have to be machined to close tolerances to have proper alinement and an adequate seal with the valve seat.

This invention relates to an improved milk pipeline valve which overcomes some of the disadvantages with such sliding plate valves.

SUMMARY OF THE INVENTION

An object of this invention is to provide a new and improved pipeline valve, particularly adapted for a milk handling system.

Another object of this invention is to provide a pipeline valve of the sliding-plate type including a valve assembly having a valve body movable in a plane generally parallel to the pipeline between a valve closed position in which the valve body overlies a valve seat secured to the pipeline and a valve open position in which the valve body is removed from the valve seat, a closure member mounted in said valve body facing said valve seat, and means for biasing the closure member toward the valve seat generally perpendicular to the pipeline to establish a seal between the closure member and the valve seat in the valve closed position.

A further object of this invention is to provide a pipeline valve as set forth in the preceding paragraph in which the valve seat is circular about an opening in alinement with an opening in the pipeline, the closure member having a spherical surface for engaging the circular valve seat.

Still another object of this invention is to provide a pipeline valve of the character described in which a connecter nipple is inserted through an opening in a rubber sealing member and the sealing member fitting snugly about the connecter nipple.

Further objects and advantages will become apparent from the following detailed description taken in connection with the accompanying drawings.

DESCRIPTION OF THE DRAWINGS

FIG. 1 is an elevational view of a pipeline valve embodying the invention, shown in closed position and mounted on a pipeline section;

FIG. 2 is a vertical section taken generally along the line 2—2 of FIG. 1;

FIG. 3 is a perspective view, on a reduced scale, of the valve, shown in open position with a connecter nipple held thereby; and FIG. 4 is a partial, horizontal section taken generally along the line 4—4 of FIG. 3.

DETAILED DESCRIPTION OF THE INVENTION

Milk pipeline valves are required principally in stanchion milking systems where milk withdrawing apparatus is utilized for milking the animal and the milk is taken from the apparatus through a hose and valve into a pipeline. The pipeline is usually mounted along the head of and above the line of stalls. The operator, in moving from one animal to the next, must operate the valve and connect the milk hose to it, making it desirable that the valve be easy to operate and so constructed that the connection may readily be made.

Referring to the drawings, a valve assembly indicated generally at 10 is shown mounted on a pipeline section 12, preferably of stainless steel or glass. A channel-shaped backing member 14 has a slot 16 in each leg of the channel for receiving a strap 18 which encircles the pipeline 12 to hold the valve in place. The strap is tightened by a screw clamp assembly 20 on the opposite side of the pipeline as shown in FIG. 2.

A sealing element 22, which is preferably of nonporous, resilient material, as soft rubber, is carried within the channel formed by the backing member 14. The sealing element 22 has an opening or passageway 24 (FIGS. 2 and 4) in communication with an opening 26 formed in the wall of the pipeline 12. The inner surface of the sealing element 22 is curved to fit the exterior surface of the pipeline 12, and sufficient pressure is exerted on the sealing element by the channel-shaped backing member 14 to afford a tightly sealed engagement therebetween. As seen in FIG. 2, a continuous, protruding sealing rib 28 is formed on the underside of sealing element 22, surrounding the opening 26 in the pipeline 12, to insure a seal between the pipeline and the sealing element 22. The sealing element 22 is made of rubber approximately 50 Durometer so that the rib 28 is compressed when tightened to the pipe, with the rib taking the form of any irregularity in the pipe. The remainder of the sealing element is designed to prevent dirt and insects from getting to the milk contacted surface area and to provide additional insurance against air leakage. In addition, the soft rubber will aid in the load distribution when used on glass pipelines to reduce breakage. The only metal parts which touch the pipeline are the strap 18 and screw clamp 20. The soft rubber pad also allows for thermal expansion when used on glass pipes and still remains tight. The opening 24 in the sealing element 22 and the opening 26 in the pipeline are preferably of the same diameter so that they join each other along a straight line eliminating any crevices in which milk might lodge.

As seen in FIGS. 2 and 4, the sealing element 22 includes a boss 30 which forms a valve seat portion which extends through an enlarged opening 32 in the bight portion of the channel-shaped backing member 14. The interior edge of the boss 30 is chamfered as at 34 to aid in centering a valve closure member (hereinafter described) and a tubular nipple 36 which is inserted into the opening 24 in the sealing element 22.

A valve assembly, generally designated 37, is supported for movement in a plane generally parallel to the pipeline 12. The valve assembly includes a body member 38 which is movable between a first position (FIG. 1) in which the body member overlies the opening 24 in the sealing element 22 to a second position (FIGS. 3 and 4) in which the opening 24 is exposed to permit the tubular nipple 36 to be inserted into the opening. The sealing element 22 fits snugly about the inserted tubular nipple as seen in FIG. 4.

The valve body 38 of the valve assembly is slidably mounted on a pair of rods 40 which extend through bores 42 (FIG. 2) in the valve body. The rods 40 are supported by a pair of ears 44 (FIG. 3) at one end and a plate 46 at the other end. The ears 44 and the plate 46 preferably are formed integrally with the channel-shaped backing member 14 and are simply bent outwardly therefrom to provide the support means for the rods 40. A coil spring 48 is positioned about one or both of the rods 40 between the valve body 38 and the supporting plate 46 to urge the valve body toward the above-mentioned first position in which the valve body 38 overlies the opening 24 in the sealing element 22. The spaced ears 44 permit the nipple 36 to be moved therebetween in the direction of arrow A (FIGS. 3 and 4) against the valve body 38 to move the body from its closed position (FIG. 1) to the open position (FIGS. 3 and 4) in which the nipple 36 can be inserted into the opening 24 in the sealing element 22. As seen best in FIG. 1, the edge of the valve body 38 is provided with a recess 50 which centers the nipple for alinement with the opening 24 in the sealing element.

The valve assembly includes a resiliently biased valve closure member 52 (FIGS. 2 and 4) which has a spherical surface 54 for engaging the valve seat about the opening 24 in the sealing element 22. The closure member 52 is housed in a recess 56 on the underside of the valve body 38 and itself has a recess 58 (FIG. 2) for receiving a coil spring 60 which biases the closure member against the valve seat formed on the sealing element 22. When the valve body 38 is in the valve closed position FIGS. 1 and 2) the spring 60 urges the convex or spherical surface 54 of the closure member 52 against the chamfered surface 34 on the boss 30. Of course, the vacuum in the pipeline 12 aids the spring 50 to establish a tight seal.

To insert the nipple 36 into the sealing element 22, the nipple is simply moved between the supporting ears 44 into the recess 50 on the valve body 38 to urge the valve body in the direction of arrow A, whereupon the valve member 52 is moved against the force of spring 60 away from the valve seat. The valve body 38 is moved in the direction of arrows A until the spring 48 becomes coil bound and the nipple 36 can be inserted into the opening 24 in the sealing element 22.

The nipple 36 is removed by simply pulling it perpendicularly away from the pipe and out of the opening 24 in the sealing element 22, whereupon spring 48 returns the valve body 38 to the closed position back over the opening 24 so that the valve member 52 seats on the sealing element about the opening.

Referring to FIGS. 3 and 4, a pair of reinforcing ribs 64 are formed on the bight portion of the channel-shaped backing member 14 to provide additional strength so that the member 14 will not distort when mounted to the pipeline. The leftmost rib 64, a as viewed in FIGS. 3 and 4, also insures that the spherical surface 54 of the spring biased closure member 52 will not touch any other parts of the valve.

We claim:

1. In a pipeline valve, a resilient valve seat associated with the a pipeline and having an opening alined with an opening in the pipeline; a connecter nipple insertable into and removable from the opening in the valve seat for communication with the pipeline opening, with said valve seat fitting snugly about the nipple when inserted into the opening in the valve seat; a valve means including a body member movable in a plane generally parallel to said pipeline between a first position overlying said opening and a second position removed from the valve seat exposing the opening in the seat to permit the nipple to be inserted into the opening, a closure member on said body portion facing said opening, said closure member having means defining a convex sealing surface for engaging the seat about said opening when said body member is overlying said opening, means for biasing said closure member toward said opening in a direction generally perpendicular to said plane, and means maintaining said closure member so that the convex sealing surface thereon constantly faces in the direction of the seat about said opening so that the surface does not tilt or otherwise move angularly relative to said plane during movement between said positions thereby preventing liquid in said pipeline from seeping about said closure member onto said body portion; and guide means on said pipeline to support said valve means for movement in said plane between said first and second positions.

2. The pipeline valve of claim 1 wherein said body member has a generally cylindrical recess facing said opening, and said closure member has a generally cylindrical portion seated in said recess, with said convex sealing surface being exposed exteriorly of said recess for engaging the seat about said opening when the body member is in said first position.

3. The pipeline valve of claim 2 wherein said closure member also has a recess facing the bottom of the recess of said body member, and said biasing means is disposed within the recess in said closure member and abuts against the bottom of the recess in said body member.

4. In a milk pipeline valve: a valve seat associated with a pipeline and having a circular opening alined with an opening in the pipeline; valve means including a body member movable in a plane generally parallel to said pipeline between a first position overlying said opening and a second position removed from said slot, a closure member having a convex sealing surface thereon and resiliently mounted on said body portion with the convex surface facing said opening, and means for biasing said closure member toward said opening in a direction generally perpendicular to said plane; guide means on said pipeline and supporting said valve means for movement between said first and second positions; and a backing plate disposed between said valve seat and said valve body with an enlarged opening alined with the opening in said valve seat, said backing plate having a raised reinforcing rib engaging said convex sealing surface when said valve means is in said second position to space the sealing surface from the remainder of said valve.

5. The pipeline valve of claim 4 wherein said valve seat includes a boss surrounding the opening therein and extending outwardly through the enlarged opening in said backing plate.

PO-1050
(5/69)

UNITED STATES PATENT OFFICE
CERTIFICATE OF CORRECTION

Patent No. 3,545,719         Dated    December 8, 1970

Inventor(s)    ROBERT J. SHULICK and RAYMOND STACHOWSKI

It is certified that error appears in the above-identified patent and that said Letters Patent are hereby corrected as shown below:

Claim 1, lines 11 & 12,   change "portion" to -- member --

Claim 4, line 6,   change "slot" to -- opening --;

line 8,   change "portion" to -- member --.

Signed and sealed this 29th day of February 1972.

(SEAL)
Attest:

EDWARD M. FLETCHER, JR.         ROBERT GOTTSCHALK
Attesting Officer                Commissioner of Patents